US012719828B2

(12) United States Patent
Li et al.

(10) Patent No.: US 12,719,828 B2
(45) Date of Patent: Aug. 25, 2026

(54) VIDEO STREAM ACQUISITION METHOD, APPARATUS AND SYSTEM, AND DEVICE AND MEDIUM

(71) Applicant: BEIJING BYTEDANCE NETWORK TECHNOLOGY CO., LTD., Beijing (CN)

(72) Inventors: Chenyu Li, Beijing (CN); Decai Liu, Beijing (CN); Yongkang Xu, Beijing (CN); Youlun Zhang, Beijing (CN); Zhaofei Wang, Beijing (CN); Jun He, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 90 days.

(21) Appl. No.: 18/843,225

(22) PCT Filed: Feb. 21, 2023

(86) PCT No.: PCT/CN2023/077301
§ 371 (c)(1),
(2) Date: Aug. 30, 2024

(87) PCT Pub. No.: WO2023/165372
PCT Pub. Date: Sep. 7, 2023

(65) Prior Publication Data

US 2025/0184305 A1 Jun. 5, 2025

(30) Foreign Application Priority Data

Mar. 1, 2022 (CN) ......................... 202210194825.6

(51) Int. Cl.
*H04L 61/45* (2022.01)
*H04N 21/239* (2011.01)
*H04N 21/6402* (2011.01)

(52) U.S. Cl.
CPC ......... *H04L 61/45* (2022.05); *H04N 21/2393* (2013.01); *H04N 21/6402* (2013.01)

(58) Field of Classification Search
None
See application file for complete search history.

(56) References Cited

U.S. PATENT DOCUMENTS 12,470,520 B2 * 11/2025 Jain ..................... H04L 12/4641
12,513,147 B2 * 12/2025 Howe ..................... H04L 63/10
(Continued)

FOREIGN PATENT DOCUMENTS

CN 102883190 A 1/2013
CN 103188574 A 7/2013
(Continued)

OTHER PUBLICATIONS

China Patent Application No. 202210194825.6; Office Action; dated Jun. 29, 2023; 14 pages.
(Continued)

*Primary Examiner* — June Sison
(74) *Attorney, Agent, or Firm* — BakerHostetler

(57) ABSTRACT

A video stream acquisition method, apparatus and system, a device and a medium are provided. The video stream acquisition method is applied to a user terminal and includes: sending a stream pulling information acquisition request to a media server, to make the media server determine target stream pulling information based on a generated domain name; acquiring the target stream pulling information, performing a domain name resolution on the target stream pulling information based on a preset domain name resolution method, and obtaining the IP address of the target intranet edge server; and based on the IP address of the target intranet edge server, sending a target stream pulling request to the target intranet edge server, and acquiring a target video
(Continued)

Sending a stream pulling information acquisition request to a media server, to make the media server determine an IP address of a target intranet edge server based on a target exit IP address in the stream pulling information acquisition request, perform a domain name generation based on a preset domain name generation method and according to the IP address of the target intranet edge server, and determine target stream pulling information based on a generated domain name — S110

Acquiring the target stream pulling information, performing a domain name resolution on the target stream pulling information based on a preset domain name resolution method, and obtaining the IP address of the target intranet edge server. — S120

Based on the IP address of the target intranet edge server, sending a target stream pulling request to the target intranet edge server, and acquiring a target video stream returned by the target intranet edge server based on the target stream pulling request — S130 stream returned by the target intranet edge server based on the target stream pulling request.

18 Claims, 5 Drawing Sheets

(56) References Cited

U.S. PATENT DOCUMENTS

| | | | | |
|---|---|---|---|---|
| 2006/0253609 | A1* | 11/2006 | Andreev | H04L 61/4552 709/245 |
| 2014/0317671 | A1* | 10/2014 | Hu | H04L 67/1021 725/116 |
| 2016/0182582 | A1* | 6/2016 | Wagenaar | H04L 65/65 709/231 |
| 2017/0163706 | A1* | 6/2017 | Liu | H04L 65/61 |
| 2020/0322646 | A1* | 10/2020 | Xie | H04L 65/80 |
| 2022/0141500 | A1* | 5/2022 | Du | H04N 21/2542 725/116 |
| 2023/0379304 | A1* | 11/2023 | Niranjan | H04L 63/0236 |
| 2023/0412567 | A1* | 12/2023 | Dharmarajan | H04L 63/0272 |
| 2024/0275787 | A1* | 8/2024 | Han | H04L 63/10 |
| 2024/0314103 | A1* | 9/2024 | Gupta | H04L 61/5046 |
| 2025/0193466 | A1* | 6/2025 | Zheng | H04N 21/2381 |
| 2025/0202996 | A1* | 6/2025 | Guo | H04L 67/63 |
| 2025/0220076 | A1* | 7/2025 | Yu | H04L 67/1097 |
| 2025/0385847 | A1* | 12/2025 | Wang | H04L 41/40 |
| 2026/0005997 | A1* | 1/2026 | Liu | H04L 61/45 |

FOREIGN PATENT DOCUMENTS

| | | | |
|---|---|---|---|
| CN | 106941507 | A | 7/2017 |
| CN | 108881944 | A | 11/2018 |
| CN | 110557655 | A | 12/2019 |
| CN | 111263171 | A | 6/2020 |
| CN | 111327697 | A | 6/2020 |
| CN | 111355731 | A | 6/2020 |
| CN | 111355971 | A | 6/2020 |
| CN | 112087644 | A | 12/2020 |
| CN | 113037855 | A | 6/2021 |
| CN | 114584808 | A | 6/2022 |
| CN | 114584808 | B | 9/2023 |
| WO | WO 2019/028683 | A1 | 2/2019 |

OTHER PUBLICATIONS

International Patent Application No. PCT/CN2023/077301; Int'l Search Report; dated Jun. 11, 2023; 2 pages.

* cited by examiner

VIDEO STREAM ACQUISITION METHOD, APPARATUS AND SYSTEM, AND DEVICE AND MEDIUM

CROSS-REFERENCE TO RELATED APPLICATION

This application is a national filing of International Patent Application No. PCT/CN2023/077301, filed on Feb. 21, 2023, which claims the priority to and benefits of Chinese Patent Application No. 202210194825.6, filed on Mar. 1, 2022. All the aforementioned patent applications are incorporated herein by reference in their entireties.

TECHNICAL FIELD

The present disclosure relates to the Internet technology, for example, relates to a video stream acquisition method, an apparatus, a system, a device, and a medium.

BACKGROUND

With the rapid development of the Internet technology, a user terminal usually acquires the video stream to be played directly from an outer net. When multiple user terminals in the same intranet access the outer net simultaneously and pull video streams from the outer net, the video is caused to freeze or even become unwatchable because of the limited exit bandwidth, which seriously affects the user viewing experience.

SUMMARY

The present disclosure provides a video stream acquisition method, an apparatus, a system, a device, and a medium, which solve the problem that the exit bandwidth is insufficient because multiple user terminals pull video streams simultaneously, ensure smoothness of video playback and improve user viewing experience.

In the first aspect, the present disclosure provides a video stream acquisition method, which is applied to a user terminal and includes:

sending a stream pulling information acquisition request to a media server, to make the media server determine an IP address of a target intranet edge server based on a target exit IP address in the stream pulling information acquisition request, perform a domain name generation based on a preset domain name generation method and according to the IP address of the target intranet edge server, and determine target stream pulling information based on a generated domain name;

acquiring the target stream pulling information, performing a domain name resolution on the target stream pulling information based on a preset domain name resolution method, and obtaining the IP address of the target intranet edge server; and based on the IP address of the target intranet edge server, sending a target stream pulling request to the target intranet edge server, and acquiring a target video stream returned by the target intranet edge server based on the target stream pulling request.

In the second aspect, the present disclosure further provides a video stream acquisition method, which is applied to a media server and includes:

receiving a stream pulling information acquisition request sent by a user terminal;

determining an IP address of a target intranet edge server based on a target exit IP address in the stream pulling information acquisition request; and performing a domain name generation based on a preset domain name generation method and according to the IP address of the target intranet edge server, and determining target stream pulling information based on a generated domain name, to make the user terminal acquire the target stream pulling information, perform a domain name resolution on the target stream pulling information based on a preset domain name resolution method, obtain the IP address of the target intranet edge server, send a target stream pulling request to the target intranet edge server based on the IP address of the target intranet edge server, and acquire a target video stream returned by the target intranet edge server based on the target stream pulling request.

In the third aspect, the present disclosure further provides a video stream acquisition method, which is applied to an intranet edge server and includes:

receiving a target stream pulling request sent by a user terminal based on an IP address of the intranet edge server, in which the IP address of the intranet edge server is obtained by the user terminal, based on a preset domain name resolution method, performing a domain name resolution on target stream pulling information acquired by utilizing a media server; and determining a target video stream corresponding to the target stream pulling request, and returning the target video stream, to make the user terminal acquire the target video stream.

In the fourth aspect, the present disclosure further provides a video stream acquisition apparatus, which is integrated in a user terminal and includes a stream pulling information acquisition request sending module, a domain name resolution module, and a target video stream acquisition module.

The stream pulling information acquisition request sending module is configured to send a stream pulling information acquisition request to a media server, which makes the media server determine an IP address of a target intranet edge server based on a target exit IP address in the stream pulling information acquisition request, perform a domain name generation based on a preset domain name generation method and according to the IP address of the target intranet edge server, and determine target stream pulling information based on a generated domain name.

The domain name resolution module is configured to acquire the target stream pulling information, perform a domain name resolution on the target stream pulling information based on a preset domain name resolution method, and obtain the IP address of the target intranet edge server.

The target video stream acquisition module is configured to send a target stream pulling request to the target intranet edge server based on the IP address of the target intranet edge server, and acquire a target video stream returned by the target intranet edge server based on the target stream pulling request.

In the fifth aspect, the present disclosure further provides a video stream acquisition apparatus, which is integrated in a media server and includes a stream pulling information acquisition request receiving module, a target intranet edge server IP address determining module, and a target stream pulling information determining module.

The stream pulling information acquisition request receiving module is configured to receive a stream pulling information acquisition request sent by a user terminal.

The target intranet edge server IP address determining module is configured to determine an IP address of a target intranet edge server based on a target exit IP address in the stream pulling information acquisition request.

The target stream pulling information determining module is configured to perform a domain name generation based on a preset domain name generation method and according to the IP address of the target intranet edge server, and determine target stream pulling information based on a generated domain name, which makes the user terminal acquire the target stream pulling information, perform a domain name resolution on the target stream pulling information based on a preset domain name resolution method, obtain the IP address of the target intranet edge server, and based on the IP address of the target intranet edge server, send a target stream pulling request to the target intranet edge server, and acquire a target video stream returned by the target intranet edge server based on the target stream pulling request.

In the sixth aspect, the present disclosure further provides a video stream acquisition apparatus, which is integrated in an intranet edge server and includes a target stream pulling request receiving module and a target video stream determining module.

The target stream pulling request receiving module is configured to receive a target stream pulling request sent by a user terminal based on an IP address of the intranet edge server. The IP address of the intranet edge server is obtained by the user terminal, based on a preset domain name resolution method, performing a domain name resolution on target stream pulling information acquired by utilizing a media server.

The target video stream determining module is configured to determine a target video stream corresponding to the target stream pulling request, and return the target video stream to make the user terminal acquire the target video stream.

In the seventh aspect, the present disclosure further provides a video stream acquisition system, which includes a user terminal, a media server and at least one intranet edge server.

The user terminal is configured to implement the video stream acquisition method provided in the first aspect.

The media server is configured to implement the video stream acquisition method provided in the second aspect.

The at least one intranet edge server is configured to implement the video stream acquisition method provided in the third aspect.

In the eighth aspect, the present disclosure further provides an electronic device, includes one or more processors, and a memory.

The memory is configured to store one or more programs.

When the one or more programs are executed by one or more processors, one or more processors is caused to implement the video stream acquisition method mentioned above.

In the ninth aspect, the present disclosure further provides a computer-readable storage medium, which stores computer programs. When the computer programs are executed by a processor, the video stream acquisition method mentioned above is implemented.

In the tenth aspect, the present disclosure further provides a computer program product, which includes computer programs carried on a non-transient computer-readable medium. The computer programs include program codes for executing the video stream acquisition method mentioned above.

DETAILED DESCRIPTION

The embodiments of the present disclosure are described below with reference to the accompanying drawings. Although some embodiments of the disclosure are shown in the accompanying drawings, the disclosure may be implemented in a variety of forms, and these embodiments are provided for the purpose of understanding the present disclosure. The accompanying drawings and embodiments of this disclosure are for illustrative purposes only.

Various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

The concepts such as "first" and "second" mentioned in the present disclosure are only used to distinguish different apparatuses, modules or units, and are not intended to limit orders or interdependence relationships of functions performed by these apparatuses, modules or units.

The modifications of "one" and "more" mentioned in the present disclosure are schematic rather than restrictive, and those skilled in the art should understand that unless otherwise explicitly stated in the context, it should be understood as "one or more".

The names of the interacted messages or information between apparatuses in the embodiments of the present disclosure are only used for illustrative purposes, but are not used to limit the scope of the messages or information.

First Embodiment

Figure 1:
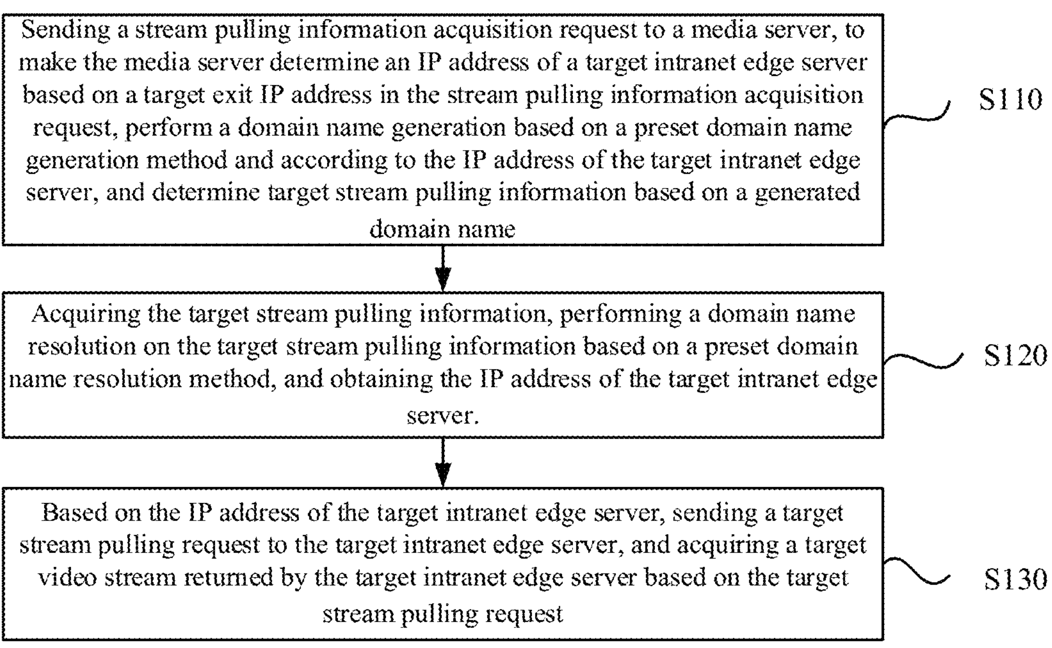
FIG. 1 is a flowchart of a video stream acquisition method provided in the first embodiment of the present disclosure.

FIG. 1 is a flowchart of a video stream acquisition method provided in the first embodiment of the present disclosure. The present embodiment may be applied to the situation that multiple user terminals in each intranet acquire a video stream simultaneously, to allow the multiple users watch the video simultaneously. In particular, the present embodiment can be applied in an application scenario where multiple user terminals in the same intranet acquire a video stream in a live broadcast scenario or an on-demand broadcast scenario. For example, the present embodiment can be applied to a scenario where each employee is required to watch the same live video or the same video-on-demand simultaneously during an internal training. The method can be executed by a video stream acquisition apparatus. The apparatus can be implemented by means of software and/or hardware, and is integrated in a user terminal. As illustrated in FIG. 1, the method includes the following steps.

S110: sending a stream pulling information acquisition request to a media server, to make the media server determine an IP address of a target intranet edge server based on a target exit IP address in the stream pulling information acquisition request, perform a domain name generation based on a preset domain name generation method and according to the IP address of the target intranet edge server, and determine target stream pulling information based on a generated domain name.

The media server may be referred to a backend server located in an outer net. The outer net refers to a WAN or the public network. The user terminal is referred to a video viewing side located in an intranet. The intranet is referred to a local area network, i.e., a group of devices formed by multiple user terminals that are interconnected in a certain area. For example, the intranet may be formed by thousands of the user terminals in a company. There may be one or more intranets. The multiple user terminals in the same intranet may use a common line to communicate with a media server in the outer net collectively. The multiple user terminals in the same intranet correspond to the same exit IP address. Each user terminal in the intranet corresponds to an intranet IP address. The intranet IP address is assigned within the intranet. The IP addresses on different intranets may be repeated but do not affect each other.

The embodiments of the present disclosure may deem the area where multiple user terminals are located as a work area, and based on the network topology structure, the correspondence relationship between the work area and the exit IP address can be determined. For example, a work area corresponds to an intranet. For example, each floor of an enterprise (equivalent to each work area) uses a different intranet, that is, multiple user terminals in the same intranet are assigned to the same work area, and a work area corresponds to an exit IP address at the moment. Or work areas correspond to an intranet. For example, the two work areas, i.e., the third floor and the fourth floor, of an enterprise share the same intranet, that is, multiple user terminals in the same intranet are assigned to work areas, and the work areas correspond to the same exit IP address at the moment. For example, in related technologies, when 1,000 user terminals in a work area watch a live broadcast or an on-demand broadcast in the outer net simultaneously, and the default bitrate of the live broadcast or the on-demand broadcast is 1 Mbps, then the exit bandwidth corresponding to the work area is required to be no less than 1,000 Mbps.

The intranet edge server may be referred to a content delivery network (CDN) node deployed in the intranet. The intranet edge server is configured to cache a video stream pulled by the user terminal, to make the user terminal may pull the video stream from the intranet edge server, and does not need to pull the video stream from the outer net, thereby saving the video exit bandwidth and solving the problem of insufficient exit bandwidth. Intranet edge servers may be deployed based on an intranet topology and a service demand. For example, in response to a work area existing in each intranet, i.e., a work area corresponds to an exit IP address, then a corresponding intranet edge server is deployed for each intranet (i.e., each area). With respect to work areas existing in each intranet, i.e., work areas correspond to the same exit IP address, then a corresponding intranet edge server is deployed for each intranet, or an intranet edge server is deployed for each work area in each intranet to save the intranet bandwidth. The target intranet edge server may be referred to an intranet edge server corresponding to a user terminal to be pulled currently, to make the user can pull streams from the intranet edge server.

The preset domain name generation method may be a method that is preset and is used to add the IP address of the target intranet edge server into the domain name, so that the IP address of the target intranet edge server can be passed to the user terminal through the domain name, thereby informing the user to pull streams from the target intranet edge server corresponding to the IP address of the target intranet edge server.

The user terminal can send a stream pulling information acquisition request to a media server. The stream pulling information acquisition request may include the target exit IP address corresponding to the user terminal and the video stream identification to be pulled by the user terminal, such as the name of the video stream, etc. After receiving the stream pulling information acquisition request, the media server can determine the corresponding IP address of the target intranet edge server based on the target exit IP address in the stream pulling information acquisition request, generate the stream pulling domain name corresponding to the IP address of the target intranet edge server based on a preset domain name generation method, and obtain target stream pulling information that includes the IP address information of the target intranet edge server according to the stream pulling domain name.

S120: acquiring the target stream pulling information, performing a domain name resolution on the target stream pulling information based on a preset domain name resolution method, and obtaining the IP address of the target intranet edge server.

The preset domain name resolution method may be referred to the domain name wildcard resolution method corresponding to the preset domain name generation method, so that the user terminal can obtain the IP address of the target intranet edge server in the target stream pulling information. For example, the embodiment of the present disclosure may perform a domain name resolution operation locally on the user terminal, so that the user terminal can quickly obtain the IP address of the resolved target intranet edge server after resolving, which improves the resolution efficiency. The embodiment of the present disclosure may also utilize a domain name resolution server located in the intranet to perform the domain name resolution operation, so that the domain name resolution server in the intranet can uniformly process the domain name resolution operation of multiple user terminals in the same intranet. The embodiment of the present disclosure may further utilize a domain name resolution server located in an outer net to perform the domain name resolution operation, so that the domain name resolution server in the outer net can uniformly process the domain name resolution operation of user terminals in all intranets, which saves device resources.

For example, the acquiring operation of the target stream pulling information may be implemented at least in the following ways:

As an implementation, "acquiring the target stream pulling information" in S120 may include: receiving the target stream pulling information sent by a media server.

Figure 2:
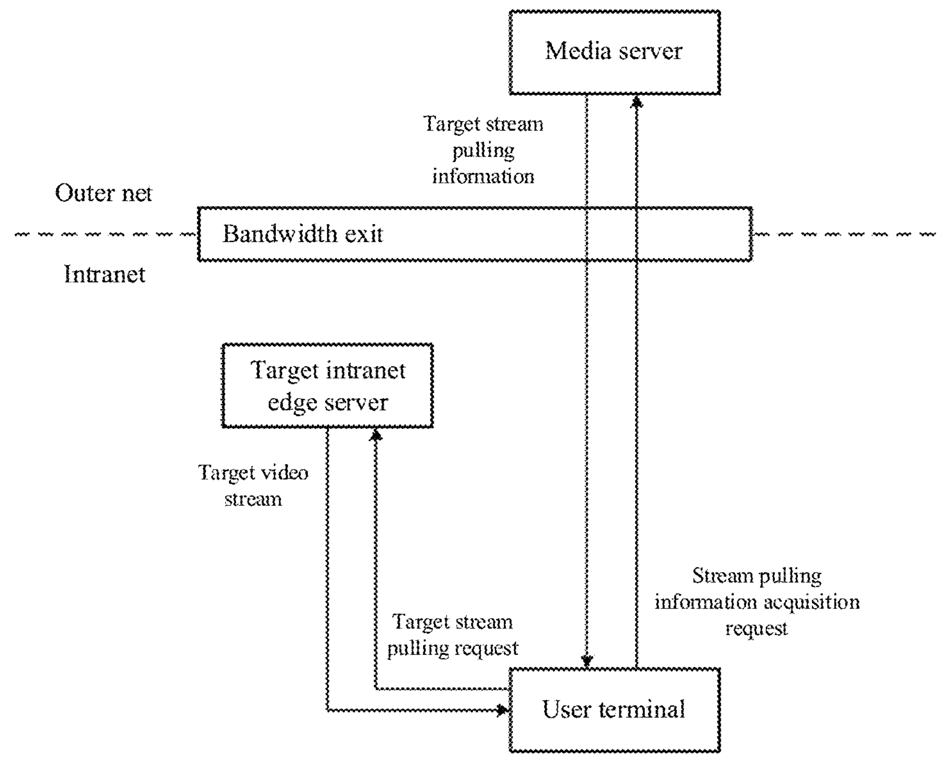
FIG. 2 is an example of a video stream acquisition process involved in the first embodiment of the present disclosure.

FIG. 2 illustrates an example of a video stream acquisition process. As illustrated in FIG. 2, a media server may, based on the target exit IP address in the stream pulling information acquisition request sent by the user terminal, directly determine the IP address of the target intranet edge server according to a correspondence relationship between a preconfigured exit IP address and an IP address of an intranet edge server. The media server may perform the domain name generation based on a preset domain name generation method and according to the IP address of the target intranet edge server, and determine the target stream pulling information based on the generated domain name, and send the target stream pulling information to the user terminal, which makes the user terminal obtain target stream pulling information by the way of receiving the target stream pulling information sent by the media server.

For the situation that the IP address of the target intranet edge server is directly obtained through the media server (as illustrated in FIG. 2), multiple user terminals in the same intranet may be made to correspond to the same IP address of the intranet edge server, which makes multiple user terminals in the same intranet pull streams from the same intranet edge server. For example, with respect to an exit IP address corresponding to a work area, i.e., an intranet corresponding to a work area, the user terminals in the work area can pull streams from the same intranet edge server. With respect to an exit IP address corresponding to work areas, i.e., an intranet corresponding to work areas, the user terminals in all work areas of the intranet also pull streams from the same intranet edge server.

As another implementation, "acquiring the target stream pulling information" in S120 may also include: receiving a stream pulling management information sent by a media server. The stream pulling management information is determined by the media server. The media server determines the IP address of the target intranet management server based on the target exit IP address in the stream pulling information acquisition request, and performs the domain name generation based on the preset domain name generation method and according to the IP address of the target intranet management server. The user terminal performs a domain name resolution on the stream pulling management information based on the preset domain name resolution method, and obtains the IP address of the target intranet management server. Based on the IP address of the target intranet management server, the user terminal sends a stream pulling address acquisition request to the target intranet management server, which makes the target intranet management server determine the IP address of the target intranet edge server based on the target intranet IP address in the stream pulling address acquisition request, perform the domain name generation based on the preset domain name generation method and according to the IP address of the target intranet edge server, and determine the target stream pulling information based on the generated domain name; and the user terminal receives the target stream pulling information sent by the target intranet management server.

The intranet management server may be a device that is pre-deployed in an intranet and is set to manage the correspondence relationship between the intranet edge server in the intranet and the user terminal in the intranet. When an exit IP address corresponds to work areas, an intranet edge server may be configured for each work area, so that in the same intranet, user terminals in different work areas can pull streams from different intranet edge servers, which avoids the situation that the user terminals in all work areas located in the intranet are pulling streams from the same intranet edge server, and saves the intranet bandwidth. The present embodiment can deploy an intranet management server and intranet edge servers in the same intranet, in which the quantity of the deployed intranet edge servers is the same as the quantity of work areas included in the intranet, thereby different work areas in the same intranet corresponding to different intranet edge servers. In the same intranet, the intranet IP addresses of different user terminals are different, thereby determining the work area where the user terminal is located based on the intranet IP address of the user terminal, and based on the correspondence relationship between the work area and the IP address of the intranet edge server, determining the IP address of the target intranet edge server corresponding to the user terminal; or based on the many-to-one correspondence relationship between the intranet IP addresses of the user terminals and the IP address of the intranet edge server, the IP address of the target intranet edge server corresponding to the user terminal can be directly determined.

Figure 3:
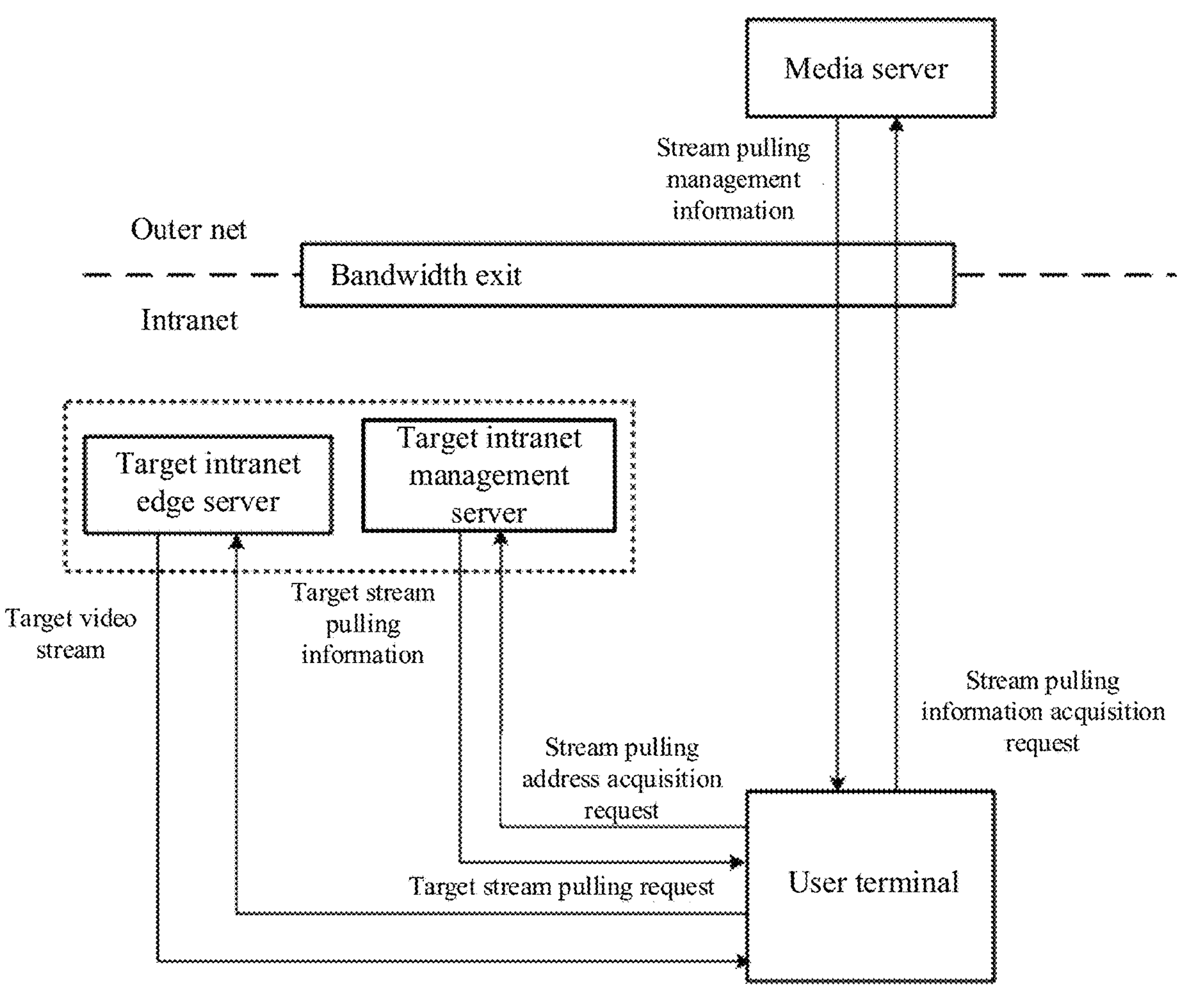
FIG. 3 is an example of another video stream acquisition process involved in the first embodiment of the present disclosure.

FIG. 3 provides an example of another video stream acquisition process. As illustrated in FIG. 3, based on the target exit IP address in the stream pulling information acquisition request sent by the user terminal and according to the correspondence relationship between the preconfigured exit IP address and the IP address of the intranet management server, the media server can determine the IP address of the intranet management server. The media server may perform the domain name generation based on a preset domain name generation method and according to the IP address of the target intranet management server, determine the stream pulling management information according to the generated domain name, and send the stream pulling management information to the user terminal. Based on the preset domain name resolution method, the user terminal may perform the domain name resolution on the received stream pulling management information to obtain the IP address of the target intranet management server, and send a stream pulling address acquisition request to the target intranet management server based on the IP address of the target intranet management server. The stream pulling address acquisition request may include the target intranet IP address corresponding to the user terminal and the video stream identification to be pulled by the user terminal, such as the video stream name, etc. The target intranet management server can determine the IP address of the target intranet edge server based on the target intranet IP address in the received stream pulling address acquisition request and according to the correspondence relationship between the preconfigured intranet IP address and the IP address of the intranet edge server. The target intranet management server may perform the domain name generation based on the preset domain name generation method and according to the IP address of the target intranet edge server, determine the target stream pulling information based on the generated domain name, and send the target stream pulling information to the user terminal, so that the user terminal may obtain the target stream pulling information by the way of receiving the target stream pulling information sent by target intranet management server.

For the situation that the IP address of the target intranet edge server is indirectly obtained by utilizing the intranet management server (as illustrated in FIG. 3), the user terminals in different work areas in the same intranet may correspond to different IP addresses of intranet edge servers, so that the user terminals in different work areas in the same intranet may pull streams from different intranet edge servers, which avoids the situation that the user terminals in all work areas located in the intranet pull streams from the same intranet edge server, i.e., solves the problem that an exit IP address corresponds to work areas, thereby saving the intranet bandwidth.

For example, "performing a domain name resolution on the target stream pulling information based on a preset domain name resolution method, and obtaining the IP address of the target intranet edge server" in S120, may include: sending the target stream pulling information to a domain name resolution server, which makes the domain name resolution server resolve the target stream pulling information based on the preset domain name resolution method, and obtain the IP address of the target intranet edge server, in which the domain name resolution server is a domain name resolution server located in an intranet or a domain name resolution server located in an outer net; and receiving the IP address of the target intranet edge server returned by the domain name resolution server.

The user terminal may utilize the domain name resolution server located in the intranet to uniformly process the domain name resolution operations of multiple user terminals in the same intranet, by sending the target stream pulling information to the domain name resolution server located in the intranet. The user terminal may also send the target stream pulling information to the domain name resolution server located in the outer net, and may utilize the domain name resolution server located in the outer net to uniformly process the domain name resolution operations of all user terminals in the intranet, thereby saving device resources.

For example, the step of performing a domain name resolution on the target stream pulling information based on a preset domain name resolution method and obtaining the IP address of the target intranet edge server, may include: extracting the target intranet edge server address information that has the preset domain name format from the target stream pulling information; and resolving the target intranet edge server address information into an IP address format, and obtaining the IP address of the target intranet edge server.

The preset domain name format may be a domain name format generated by utilizing a preset domain name generation method. For example, the IP address of the target intranet edge server is: 10.95.3.11, and the address information of the target intranet edge server that has the preset domain name format may be: 10-95-3-11.

The domain name resolution server located in the intranet or outer net or local user terminal may extract the address information of the target intranet edge server in the received stream pulling information. For example, the stream pulling address in the target stream pulling information is: https://10-95-3-11.xx.com/yy.m3u8?domain=aaa.bbb.cn, then the extracted address information of the target intranet edge server is: 10-95-3-11. Then the address information of the target intranet edge server may be resolved into the IP address format to obtain the IP address of the target intranet edge server, for example, 10.95.3.11, thereby implementing the situation of accessing the specified intranet edge server by the way of the domain name resolution.

For example, for the situation that the IP address of the target intranet edge server is indirectly obtained by utilizing the intranet management server (as illustrated in FIG. 3), "performing a domain name resolution on the stream pulling management information based on the preset domain name resolution method, and obtaining the IP address of the target intranet management server", may include: extracting the address information of the target intranet management server that has the preset domain name format in the stream pulling management information; and resolving the address information of the target internal management server into the IP address format, and obtaining the IP address of the target intranet management server.

The stream pulling management information may be resolved based on the same domain name resolution method to obtain the IP address of the target intranet management server. For example, the address of the target intranet management server in the stream pulling management information is: https://10-225-70-182.xx.com: 9755/live/stream_config, then the extracted address information of the target intranet management server is: 10-225-70-182. Then the address information of the target intranet management server may be resolved into the IP address format to obtain the IP address of the target intranet management server, for example, 10.225.70.182, thereby implementing the situation of accessing the specified intranet management server by the way of the domain name resolution.

S130: based on the IP address of the target intranet edge server, sending a target stream pulling request to the target intranet edge server, and acquiring a target video stream returned by the target intranet edge server based on the target stream pulling request.

The user terminal may pull streams from the target intranet edge server located in the intranet based on the IP address of the target intranet edge server. The target intranet edge server may pre-cache the video stream to be pulled. Alternatively, for the first stream pulling request received for pulling the target video stream, the target intranet edge server may pull streams from an outer net edge server (e.g., an outer net CDN node) based on the outer net stream pulling address (e.g., a aaa.bbb.cn) in the stream pulling request, and cache the pulled target video stream, so that the cached target video stream can be directly returned for a subsequent stream pulling request. Thus, the exit bandwidth that needs to be used for N video streams may be changed into an exit bandwidth that only needs to be used for one video stream, which greatly saves the exit bandwidth of video, avoids the poor smoothness of video playback caused by insufficient exit bandwidth, improves the efficiency of acquiring video streams, and also improves the smoothness of video playback and greatly improves the user viewing experience.

In the technical scheme of the embodiment of the present disclosure, the user terminal sends a stream pulling information acquisition request to a media server. The media server determines an IP address of a target intranet edge server based on a target exit IP address in the stream pulling information acquisition request, performs a domain name generation based on a preset domain name generation method and according to the IP address of the target intranet edge server, and determines the target stream pulling information based on the generated domain name. The user terminal acquires the target stream pulling information, performs a domain name resolution on the target stream pulling information based on a preset domain name resolution method, and obtains the IP address of the target intranet edge server, thereby sending a target stream pulling request to the target intranet edge server based on the IP address of the target intranet edge server, and acquiring a target video stream returned by the target intranet edge server based on the target stream pulling request. By deploying the intranet edge server in the intranet, and by the way of the domain name resolution, the user terminal can directly pull the video stream from the specified target intranet edge server, and does not need to pull the video stream from the outer net, thereby greatly saving the exit bandwidth and improving the efficiency of acquiring the video stream, further ensuring the smoothness of video playback, and improving user viewing experience.

Second Embodiment

Figure 4:
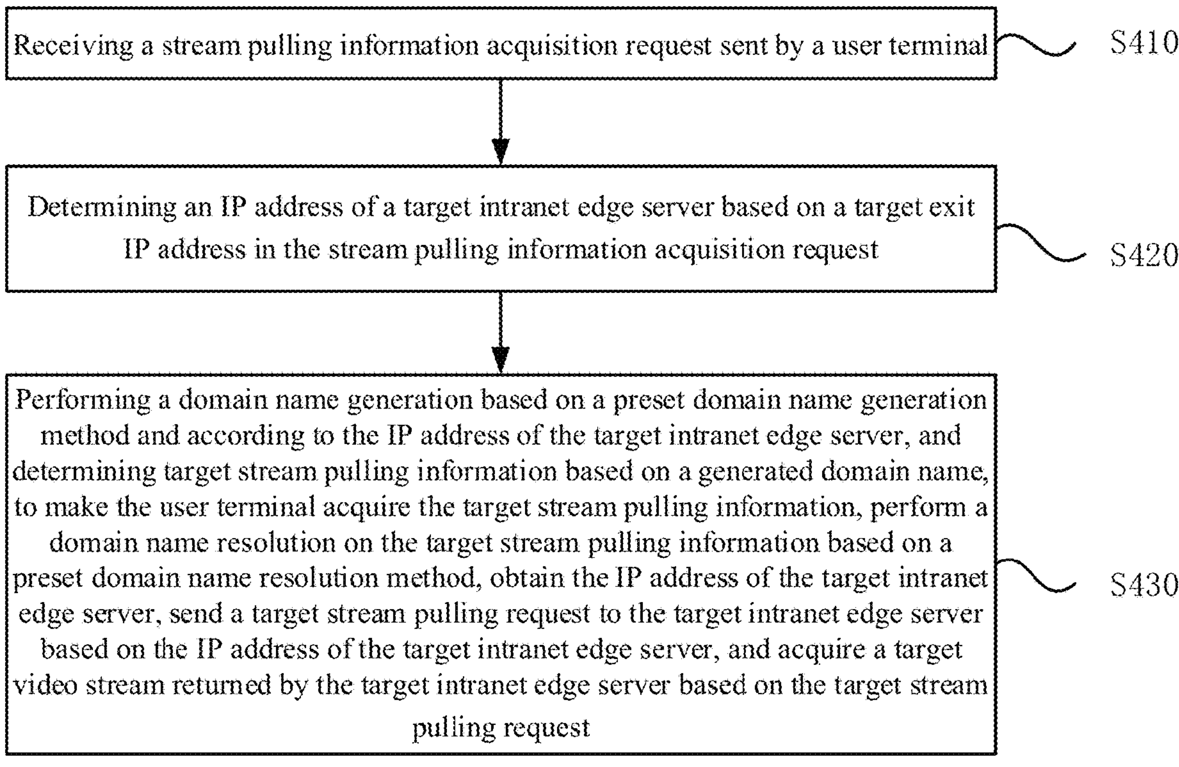
FIG. 4 is a flowchart of a video stream acquisition method provided in the second embodiment of the present disclosure.

FIG. 4 is a flowchart of a video stream acquisition method provided in the second embodiment of the present disclosure. The present embodiment may be applied to the situation that multiple user terminals in each intranet acquire a video stream simultaneously, to allow the multiple users watch the video simultaneously. In particularly, the present embodiment can be used in an application scenario where multiple user terminals in the same intranet acquire a video stream, in a live broadcast scenario or an on-demand broadcast scenario. The method can be executed by a video stream acquisition apparatus. The apparatus can be implemented by means of software and/or hardware can be integrated into a media server. As illustrated in FIG. 4, the method includes the following steps:

S410: receiving a stream pulling information acquisition request sent by a user terminal.

S420: determining an IP address of a target intranet edge server based on a target exit IP address in the stream pulling information acquisition request.

S430: performing a domain name generation based on a preset domain name generation method and according to the IP address of the target intranet edge server, and determining target stream pulling information based on a generated domain name, to make the user terminal acquire the target stream pulling information, perform a domain name resolution on the target stream pulling information based on a preset domain name resolution method, obtain the IP address of the target intranet edge server, send a target stream pulling request to the target intranet edge server based on the IP address of the target intranet edge server, and acquire a target video stream returned by the target intranet edge server based on the target stream pulling request.

For example, S420 may include: based on a correspondence relationship between a preconfigured exit IP address and an IP address of an intranet edge server, and based on the target exit IP address in the stream pulling information acquisition request, determining the IP address of the target intranet edge server. Correspondingly, after S430, the method further includes: sending the target stream pulling information to the user terminal.

For the situation that the IP address of the target intranet edge server is directly obtained through the media server (as illustrated in FIG. 2 in the above embodiment), based on the service demand, the correspondence relationship between the exit IP address corresponding to each intranet and the IP address of the intranet edge server corresponding to the intranet may be preconfigured in the media server. Thus, in an actual use, the media server may directly determine the IP address of the target intranet edge server corresponding to the target exit IP address based on the correspondence relationship and the target exit IP address in the stream pulling information acquisition request, and send the target stream pulling information determined based on the IP address of the target intranet edge server to the user terminal, so that the user terminal can obtain the target stream pulling information sent by the media server.

For example, S420 and S430 may include: determining an IP address of a target intranet management server based on the target exit IP address in the stream pulling information acquisition request, performing the domain name generation based on the preset domain name generation method and according to the IP address of the target intranet management server, and determining stream pulling management information based on the generated domain name; sending the stream pulling management information to the user terminal, to make the user terminal perform the domain name resolution on the stream pulling management information based on the preset domain name resolution method, and obtain the IP address of the target intranet management server, and based on the IP address of the target intranet management server, sending a stream pulling address acquisition request to the target intranet management server, to make the target intranet management server determine the IP address of the target intranet edge server based on a target intranet IP address in the stream pulling address acquisition request, perform the domain name generation based on the preset domain name generation method and according to the IP address of the target intranet edge server, and determine the target stream pulling information based on the generated domain name and return the target stream pulling information.

The intranet management server may be referred to the relevant description of the above embodiment, which will not be repeated here.

For example, the target intranet management server determines the IP address of the target intranet edge server based on the target intranet IP address in the stream pulling address acquisition request, which may include: the target intranet management server determines the IP address of the target intranet edge server, based on the correspondence relationship between the preconfigured intranet IP address and the IP address of the intranet edge server, and based on the target intranet IP address in the stream pulling address acquisition request.

For the situation that the IP address of the target intranet edge server is indirectly obtained by utilizing the intranet management server (as illustrated in FIG. 3 in the above embodiment), based on the service demand, the correspondence relationship between the exit IP address corresponding to each intranet and the IP address of the intranet management server corresponding to each intranet, may be preconfigured in the media server. Based on the network topology structure, the correspondence relationship between the intranet IP address corresponding to each user terminal in each work area and the IP address of the intranet edge server corresponding to the work area, may be preconfigured in each intranet management server. In an actual use, the media server, based on the target exit IP address in the stream pulling information acquisition request and the preconfigured correspondence relationship between the exit IP address and the IP address of the intranet management server, can determine the IP address of the target intranet management server corresponding to the target exit IP address, and send the stream pulling management information determined based on the IP address of the target intranet management server to the user terminal. Based on the preset domain name resolution method, the user terminal performs the domain name resolution on the stream pulling management information, obtain the IP address of the target intranet management server, and send a stream pulling address acquisition request to the target intranet management server located in the intranet based on the IP address of the target intranet management server. The target intranet management server, based on the target intranet IP address in the stream pulling address acquisition request and the preconfigured correspondence relationship between the intranet IP address and the IP address of the intranet edge server, can determine the IP address of target intranet edge server corresponding to the target intranet IP address, perform the domain name generation based on the preset domain name generation method and according to the IP address of the target intranet edge server, and determine the target stream pulling information according to the generated domain name and return the target stream pulling information, so that the user terminal can obtain the target stream pulling information sent by the target intranet management server.

After the user terminal receives the target stream pulling information sent by the media server or the target stream pulling information sent by the target intranet management server, the user terminal may perform the domain name resolution on the target stream pulling information based on the preset domain name resolution method, and obtain the IP address of the target intranet edge server, thereby implementing the situation of accessing the specified intranet edge server by the way of the domain name resolution. The process of the domain name resolution may be referred to the relevant description of the above embodiment, which will not be repeated here. Based on the IP address of the target intranet edge server, the user terminal can pull streams from the target intranet edge server located in the intranet, and does not need to pull the video stream from the outer net, thereby greatly saving the video exit bandwidth, avoiding the situation of the poor smoothness of video playback caused by insufficient exit bandwidth, improving the efficiency of acquiring video streams, as well as improving the smoothness of video playback and greatly improving user viewing experience.

For example, in S430, "performing a domain name generation based on a preset domain name generation method and according to the IP address of the target intranet edge server, and determining target stream pulling information based on a generated domain name," may include: based on a preset domain name format, performing a format conversion on the IP address of the target intranet edge server, and adding a converted target intranet edge server address information into a stream pulling address, and determining the target stream pulling information.

The preset domain name format may be a character format that is preset and is allowed by the domain name. For example, the IP address of the target intranet edge server is: 10.95.3.11, the address information of the target intranet edge server obtained by utilizing the preset domain name format for conversion is: 10-95-3-11, and the address information of the target intranet edge server may be spliced into the stream pulling address, such as adding the address information of the target intranet edge server to the front of the target video stream identification to be pulled. Furthermore, the actual outer net stream pulling address may be spliced to the target stream pulling information, so that the target video stream may be pulled from the outer net stream pulling address for the first stream pulling request. For example, the stream pulling address corresponding to the target stream pulling information is: https://10-95-3-11.xx.com/yy.m3u8?domain=aaa.bbb.cn, in which xx.com is the target video stream identification to be pulled, and aaa.bbb.cn is the outer net stream pulling address.

For example, for the situation that the IP address of the target intranet edge server is indirectly obtained by utilizing the intranet management server (as illustrated in FIG. 3 in the above embodiment), "performing a domain name generation based on a preset domain name generation method and according to the IP address of the target intranet edge server, and determining stream pulling management information," may include: based on a preset domain name format, performing a format conversion on the IP address of the target intranet management serve, obtaining the address information of the target intranet management server, and determining the stream pulling management information based on the address information of the target intranet management server. In addition to the address of the target intranet management server, the stream pulling management information may further include the outer net stream pulling address, so that when the target video stream does not exist in the cache of the intranet edge server, the target video stream can be pulled from the outer net stream pulling address for the first stream pulling request and cached.

The media server can determine the stream pulling management information based on a similar method to that for the above target stream pulling information. For example, the IP address of the target intranet management server is: 10.225.70.182, the address information of the target intranet management server obtained by utilizing the preset domain name format conversion is: 10-225-70-182, and the address of the target intranet management server in the stream pulling management information generated based on the address information of the target intranet management server is: https://10-225-70-182.xx.com: 9755/live/stream_config. When a user terminal needs to acquire the outer net stream pulling address, then the determined outer net stream pulling address, such as https://aaa.bbb.cn/yy.m3u8?domain=aaa.bbb.cn, is added into the stream pulling management information and sent to the user terminal.

In the technical scheme of the present embodiment, the user terminal sends a stream pulling information acquisition request to the media server. The media server determines the IP address of the target intranet edge server based on the target exit IP address in the stream pulling information acquisition request, and performs the domain name generation based on a preset domain name generation method and according to the IP address of the target intranet edge server, and determines the target stream pulling information based on the generated domain name. The user terminal acquires the target stream pulling information, performs the domain name resolution on the target stream pulling information based on the preset domain name resolution method, and obtains the IP address of the target intranet edge server, thereby, based on the IP address of the target intranet edge server, sending a target stream pulling request to the target intranet edge server located in the intranet, and acquiring the target video stream returned by the target intranet edge server based on the target stream pulling request. By deploying the intranet edge server in the intranet, and by the way of the domain name resolution, the user terminal can directly pull the video stream from the specified target intranet edge server, and does not need to pull the video stream from the outer net, thereby greatly saving the exit bandwidth and improving the efficiency for acquiring the video stream, further ensuring the smoothness of video playback, and improving the user viewing experience.

Third Embodiment

Figure 5:
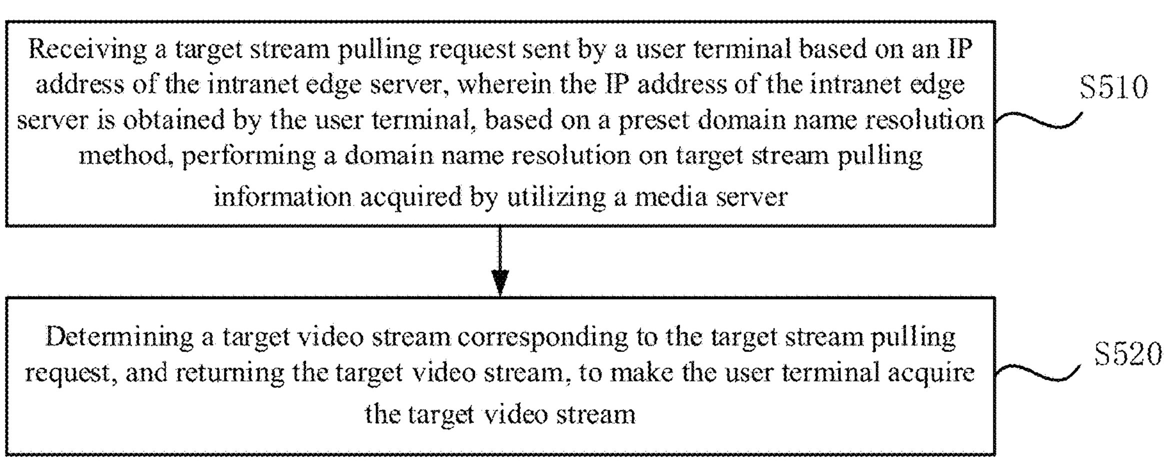
FIG. 5 is a flow chart of a video stream acquisition method provided in the third embodiment of the present disclosure.

FIG. 5 is a flowchart of a video stream acquisition method provided in the third embodiment of the present disclosure. The present embodiment may be applied to the situation that multiple user terminals in each intranet acquire a video stream simultaneously, to allow the multiple users watch the video simultaneously. In particularly, the present embodiment can be used in an application scenario where multiple user terminals in the same intranet acquire a video stream in a live broadcast scenario or an on-demand broadcast scenario. The method may be executed by a video stream acquisition apparatus. The apparatus may be implemented by means of software and/or hardware, and is integrated into an intranet edge server. As illustrated in FIG. 5, the method includes the following steps:

S510: receiving a target stream pulling request sent by a user terminal based on an IP address of the intranet edge server, wherein the IP address of the intranet edge server is obtained by the user terminal, based on a preset domain name resolution method, performing a domain name resolution on target stream pulling information acquired by utilizing a media server.

The user terminal may generate a target stream pulling request based on the target video stream identification corresponding to the target video stream to be pulled, or generate a target stream pulling request based on the target video stream identification corresponding to the target video stream to be pulled and an actual outer net stream pulling address, and send the target stream pulling request to the specified intranet edge server based on the IP address of the intranet edge server directly obtained through the media server or the IP address of the intranet edge server indirectly obtained through the intranet management server, so that the intranet edge server can receive the target stream pulling request sent by the user terminal.

S520: determining a target video stream corresponding to the target stream pulling request, and returning the target video stream, to make the user terminal acquire the target video stream.

The intranet edge server can determine the cached target video stream based on the target video stream identification in the target stream pulling request sent by the user terminal, and send the cached target video stream to the user terminal, so that the user terminal can directly pull streams from the edge server located in the intranet, and does not need to pull the video stream from the outer net, thereby greatly saving video exit bandwidth, avoiding the situation of the poor smoothness of video playback caused by insufficient exit bandwidth, improving efficiency of acquiring video streams, and also improving smoothness of video playback and greatly improving user viewing experience.

For example, S520 may include: based on the target video stream identification in the target stream pulling request, determining the target video stream from a cached video stream that is cached in advance.

In the on-demand broadcast scenario, each on-demand video may be cached in each intranet edge server in advance, so that when the intranet edge server receives the target stream pulling request, the intranet edge server can determine the target video stream from the cached video streams based on the target video stream identification to be pulled. Therefore, when multiple user terminals in the same intranet need to watch the same on-demand video simultaneously, the multiple user terminals can directly obtain the on-demand video cached in the intranet edge server, and does not need to pull the video stream from the outer net, which greatly saves the exit bandwidth, and improves the efficiency of acquiring video streams, thereby ensuring the smoothness of video playback, and improving user viewing experience.

For example, S520 may include: based on the target video stream identification in the target stream pulling request, detecting whether the target video stream exists in a cached video stream that has been cached currently; in response to the target video stream existing in the cached video stream that has been cached currently, determining the cached video stream as the target video stream; in response to the target video stream being absent from the cached video stream that has been cached currently, pulling the target video stream from an outer net edge server based on an outer net stream pulling address in the target stream pulling request, and caching the pulled target video stream.

In the live broadcast scenario, because the live video is generated in real time, and the live video cannot be cached in advance. Thus, when the intranet edge server receives the first target stream pulling request for pulling the target video stream, the intranet edge server can pull streams from the outer net edge server (e.g., the outer net CDN node) based on the outer net stream pulling address in the stream pulling request, and cache the pulled target video stream, so that when the subsequent target stream pulling request is received, the target video stream that has been cached currently can be returned directly, and does not need to be pulled from the outer net, thereby changing the exit bandwidth that needs to be used for N video streams into an exit bandwidth that only needs to be used for one video stream, which greatly saves the exit bandwidth of the video, avoids the poor smoothness of video playback caused by insufficient exit bandwidth, improves the efficiency of acquiring video streams, and also improves the smoothness of video playback and greatly improves user viewing experience.

In the technical scheme of the embodiment of the present disclosure, the user terminal sends a stream pulling information acquisition request to a media server. The media server determines an IP address of a target intranet edge server based on a target exit IP address in the stream pulling information acquisition request, performs a domain name generation based on a preset domain name generation method and according to the IP address of the target intranet edge server, and determines the target stream pulling information based on the generated domain name. The user terminal acquires the target stream pulling information, performs a domain name resolution on the target stream pulling information based on a preset domain name resolution method, and obtains the IP address of the target intranet edge server, thereby sending a target stream pulling request to the target intranet edge server based on the IP address of the target intranet edge server, and acquiring a target video stream returned by the target intranet edge server based on the target stream pulling request. By deploying the intranet edge server in the intranet, and by the way of the domain name resolution, the user terminal can directly pull the video stream from the specified target intranet edge server, and does not need to pull the video stream from the outer net, thereby greatly saving the exit bandwidth and improving the efficiency of acquiring the video stream, further ensuring the smoothness of video playback, and improving user viewing experience.

The following is the embodiment of a video stream acquisition apparatus provided in the embodiments of the present disclosure. The apparatus and the video stream acquisition method of the first embodiment belong to the same concept. The details that are not described in detail in the embodiment of the video stream acquisition apparatus may be referred to the first embodiment.

Fourth Embodiment

Figure 6:
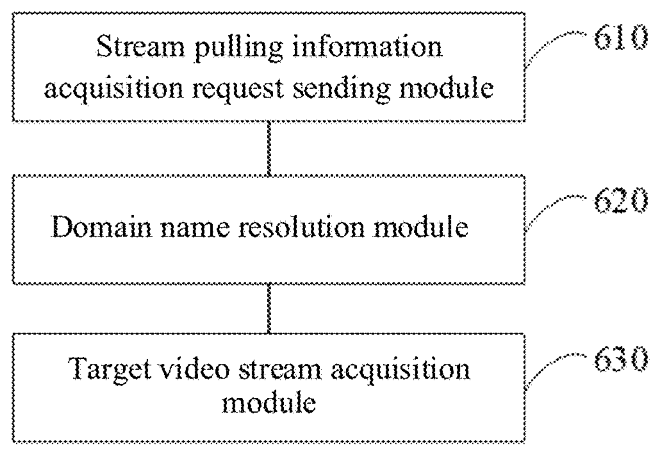
FIG. 6 is a structural schematic diagram of a video stream acquisition apparatus provided in the fourth embodiment of the present disclosure.

FIG. 6 is a structural schematic diagram of a video stream acquisition apparatus provided in the fourth embodiment of the present disclosure. The present embodiment may be applied to the situation that multiple user terminals in each intranet acquire a video stream simultaneously, to allow the multiple users watch the video simultaneously. In particularly, the present embodiment can be used in an application scenario where multiple user terminals in the same intranet acquire a video stream in a live broadcast scenario or an on-demand broadcast scenario. As illustrated in FIG. 6, the apparatus is integrated in the user terminal, and includes a stream pulling information acquisition request sending module 610, a domain name resolution module 620, and a target video stream acquisition module 630.

The stream pulling information acquisition request sending module 610 is configured to send a stream pulling information acquisition request to a media server, to make the media server determine an IP address of a target intranet edge server based on a target exit IP address in the stream pulling information acquisition request, perform a domain name generation based on a preset domain name generation method and according to the IP address of the target intranet edge server, and determine target stream pulling information based on a generated domain name; the domain name resolution module 620 is configured to acquire the target stream pulling information, perform a domain name resolution on the target stream pulling information based on a preset domain name resolution method, and obtain the IP address of the target intranet edge server; and the target video stream acquisition module 630 is configured to send a target stream pulling request to the target intranet edge server based on the IP address of the target intranet edge server, and acquire a target video stream returned by the target intranet edge server based on the target stream pulling request.

On the basis of the above technical scheme, the domain name resolution module 620 includes a target stream pulling information acquisition unit, which is configured to receive the target stream pulling information sent by the media server.

On the basis of the above technical scheme, the target stream pulling information acquisition unit is further configured to: receive a stream pulling management information sent by the media server, in which the stream pulling management information is determined by the media server determining an IP address of a target intranet management server based on the target exit IP address in the stream pulling information acquisition request, and performing the domain name generation based on a preset domain name generation method and according to the IP address of the target intranet management server; based on the preset domain name resolution method, perform the domain name resolution on the stream pulling management information to obtain the IP address of the target intranet management server; based on the IP address of the target intranet management server, send a stream pulling address acquisition request to the target intranet management server, to make the target intranet management server determine the IP address of the target intranet edge server based on the target intranet IP address in the stream pulling address acquisition request, perform the domain name generation based on the preset domain name generation method and according to the IP address of the target intranet edge server, and determine the target stream pulling information based on the generated domain name; and receive the target stream pulling information sent by the target intranet management server.

On the basis of the above technical scheme, the domain name resolution module 620 further include a domain name resolving unit, which is configured to send the target stream pulling information to a domain name resolution server, to make the domain name resolution server perform the domain name resolution on the target stream pulling information based on a preset domain name resolution method, and obtain the IP address of the target intranet edge server, in which the domain name resolution server is a domain name resolution server in an intranet or a domain name resolution server in an outer net; receive the IP address of the target intranet edge server returned by the domain name resolution server.

On the basis of the above technical scheme, the domain name resolving unit is further configured to: extract target intranet edge server address information that has a preset domain name format from the target stream pulling information; and resolve the target intranet edge server address information into an IP address format, and obtain the IP address of the target intranet edge server.

The video stream acquisition apparatus provided in any embodiment of the present disclosure may execute the video stream acquisition method provided in the first embodiment of the present disclosure, and has the corresponding functional modules and effects for executing the video stream acquisition method.

In the above embodiment of the video stream acquisition apparatus, the units and modules included therein are only divided according to the functional logic, but are not limited to the above division, as long as the corresponding functions can be implemented. In addition, the names of the functional units are also for ease of distinction only, and are not intended to limit the scope of protection of the present disclosure.

The following is the embodiment of a video stream acquisition apparatus provided in the embodiments of the present disclosure. The apparatus and the video stream acquisition method of the second embodiment belong to the same concept. The details that are not described in detail in the embodiment of the video stream acquisition apparatus may be referred to the second embodiment.

Fifth Embodiment

Figure 7:
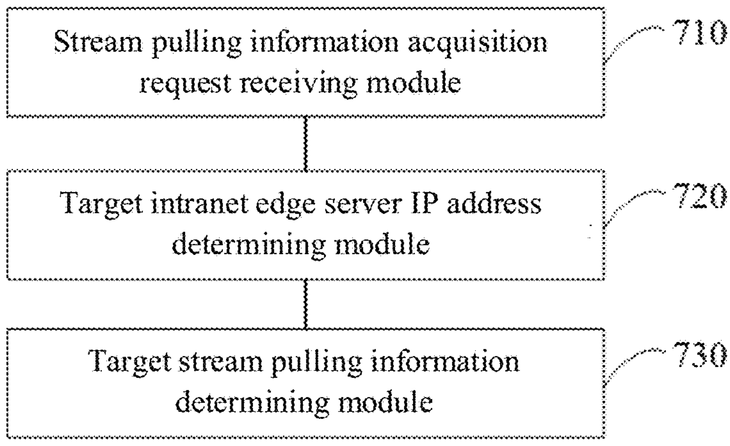
FIG. 7 is a structural schematic diagram of a video stream acquisition apparatus provided in the fifth embodiment of the present disclosure.

FIG. 7 is a structural schematic diagram of a video stream acquisition apparatus provided in the fifth embodiment of the present disclosure. The present embodiment may be applied to the situation that multiple user terminals in each intranet acquire a video stream simultaneously, to allow e the multiple users watch the video simultaneously. In particularly, the present embodiment can be used in an application scenario where multiple user terminals in the same intranet acquire a video stream in a live broadcast scenario or an on-demand broadcast scenario. As illustrated in FIG. 7, the apparatus is integrated in a media server, and includes a stream pulling information acquisition request receiving module 710, a target intranet edge server IP address determining module 720, and a target stream pulling information determining module 730.

The stream pulling information acquisition request receiving module 710 is configured to receive a stream pulling information acquisition request sent by a user terminal. The target intranet edge server IP address determining module 720 is configured to determine an IP address of a target intranet edge server based on a target exit IP address in the stream pulling information acquisition request. The target stream pulling information determining module 730 is configured to perform a domain name generation based on a preset domain name generation method and according to the IP address of the target intranet edge server, and determine target stream pulling information based on a generated domain name, to make the user terminal acquire the target stream pulling information, perform a domain name resolution on the target stream pulling information based on a preset domain name resolution method, obtain the IP address of the target intranet edge server, and based on the IP address of the target intranet edge server, send a target stream pulling request to the target intranet edge server, and acquire a target video stream returned by the target intranet edge server based on the target stream pulling request.

On the basis of the above technical scheme, the target intranet edge server IP address determining module 720 is configured to, based on a correspondence relationship between a preconfigured exit IP address and an IP address of an intranet edge server, and based on the target exit IP address in the stream pulling information acquisition request, determine the IP address of the target intranet edge server.

The apparatus further includes a target stream pulling information sending module. The target stream pulling information sending module is configured to, after the performing a domain name generation based on a preset domain name generation method and according to the IP address of the target intranet edge server, and determining target stream pulling information based on a generated domain name, send the target stream pulling information to the user terminal.

On the basis of the above technical scheme, the target intranet edge server IP address determining module 720 and the target stream pulling information determining module 730 are configured to: determine an IP address of a target intranet management server based on the target exit IP address in the stream pulling information acquisition request, perform the domain name generation based on the preset domain name generation method and according to the IP address of the target intranet management server, and determine stream pulling management information based on the generated domain name; send the stream pulling management information to the user terminal, to make the user terminal perform the domain name resolution on the stream pulling management information based on the preset domain name resolution method, and obtain the IP address of the target intranet management server, and based on the IP address of the target intranet management server, send a stream pulling address acquisition request to the target intranet management server, to make the target intranet management server determine the IP address of the target intranet edge server based on a target intranet IP address in the stream pulling address acquisition request, perform the domain name generation based on the preset domain name generation method and according to the IP address of the target intranet edge server, and determine the target stream pulling information based on the generated domain name.

On the basis of the above technical scheme, the target stream pulling information determining module 730 are configured to, based on a preset domain name format, perform a format conversion on the IP address of the target intranet edge server, and add a converted target intranet edge server address information into a stream pulling address, and determine the target stream pulling information.

On the basis of the above technical scheme, the target intranet management server includes a target intranet edge server IP address determining unit. The target intranet edge server IP address determining unit is configured to determine the IP address of the target intranet edge server, based on a correspondence relationship between a preconfigured intranet IP address and an IP address of an intranet edge server, and based on the target intranet IP address in the stream pulling address acquisition request.

The video stream acquisition apparatus provided in any embodiment of the present disclosure can execute the video stream acquisition method provided in the second embodiment of the present disclosure, and has the corresponding functional modules and effects for executing the video stream acquisition method.

In the embodiment of the video stream acquisition apparatus, the units and modules included therein are only divided according to the functional logic, but are not limited to the above division, as long as the corresponding functions can be implemented. In addition, the names of the functional units are also for ease of distinction only, and are not intended to limit the scope of protection of the present disclosure.

The following is the embodiment of a video stream acquisition apparatus provided in the embodiments of the present disclosure. The apparatus and the video stream acquisition method of the third embodiment belong to the same concept. The details that are not described in detail in the embodiment of the video stream acquisition apparatus may be referred to the third embodiment.

Sixth Embodiment

Figure 8:
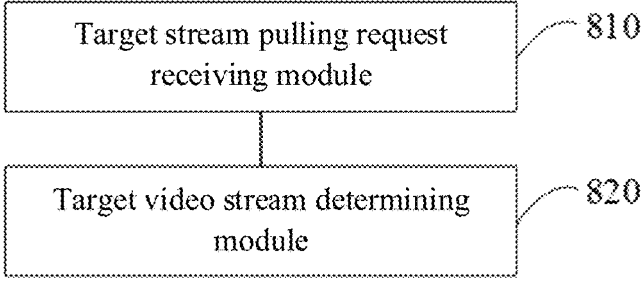
FIG. 8 is a structural schematic diagram of a video stream acquisition apparatus provided in the sixth embodiment of the present disclosure.

FIG. 8 is a structural schematic diagram of a video stream acquisition apparatus provided in the sixth embodiment of the present disclosure. The present embodiment may be applied to the situation that multiple user terminals in each intranet acquire a video stream simultaneously, to allow the multiple users watch the video simultaneously. In particularly, the present embodiment can be used in an application scenario where multiple user terminals in the same intranet acquire a video stream in a live broadcast scenario or an on-demand broadcast scenario. As illustrated in FIG. 8, the apparatus is integrated in an intranet edge server, and includes a target stream pulling request receiving module 810 and a target video stream determining module 820.

The target stream pulling request receiving module 810 is configured to receive a target stream pulling request sent by a user terminal based on an IP address of the intranet edge server, wherein the IP address of the intranet edge server is obtained by the user terminal, based on a preset domain name resolution method, performing a domain name resolution on target stream pulling information acquired by utilizing a media server. The target video stream determining module 820 is configured to determine a target video stream corresponding to the target stream pulling request, and return the target video stream to make the user terminal acquire the target video stream.

On the basis of the above technical scheme, the target video stream determining module 820 is configured to, based on the target video stream identification in the target stream pulling request, determine the target video stream from a cached video stream that is cached in advance.

On the basis of the above technical scheme, the target video stream determining module 820 is further configured to: based on the target video stream identification in the target stream pulling request, detect whether the target video stream exists in a cached video stream that has been cached currently; in response to the target video stream existing in the cached video stream that has been cached currently, determine the cached video stream as the target video stream; in response to the target video stream being absent from the cached video stream that has been cached currently, pull the target video stream from an outer net edge server based on an outer net stream pulling address in the target stream pulling request, and cache the pulled target video stream.

The video stream acquisition apparatus provided in any embodiment of the present disclosure may execute the video stream acquisition method provided in the third embodiment of the present disclosure, and has the corresponding functional modules and effects for executing the video stream acquisition method.

In the embodiment of the video stream acquisition apparatus, the units and modules included therein only divided according to the functional logic, but are not limited to the above division, as long as the corresponding functions can be implemented. In addition, the names of the functional units are also for ease of distinction only, and are not intended to limit the scope of protection of the present disclosure.

Seventh Embodiment

Figure 9:
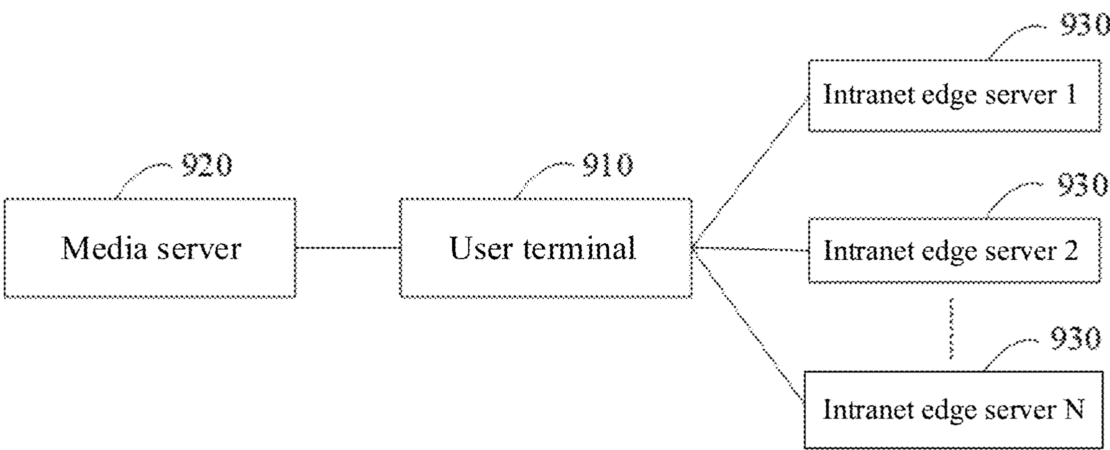
FIG. 9 is a structural schematic diagram of a video stream acquisition system provided in the seventh embodiment of the present disclosure.

FIG. 9 is a structural schematic diagram of a video stream acquisition system provided in the seventh embodiment of the present disclosure. The present embodiment may be applied to the situation that multiple user terminals in each intranet acquire a video stream simultaneously, to allow the multiple users watch the video simultaneously. In particularly, the present embodiment can be used in an application scenario where multiple user terminals in the same intranet acquire a video stream in a live broadcast scenario or an on-demand broadcast scenario. As illustrated in FIG. 9, the system includes a user terminal 910, a media server 920, and at least one intranet edge server 930.

The user terminal 910 is configured to implement the video stream acquisition method provided in the first embodiment of the present disclosure. The media server 920 is configured to implement the video stream acquisition method provided in the second embodiment of the present disclosure. The intranet edge server 930 is configured to implement the video stream acquisition method provided in the third embodiment of the present disclosure.

For example, for the situation that the IP address of the target intranet edge server is directly obtained through the media server, an intranet edge server 930 may be deployed for each intranet. The implementation process of the video stream acquisition system may be as follows: The user terminal 910 sends a stream pulling information acquisition request to the media server 920. The media server 920 determines the IP address of the target intranet edge server based on the target exit IP address in the stream pulling information acquisition request, performs a domain name generation based on a preset domain name generation method and according to the IP address of the target intranet edge server, determines the target stream pulling information according to the generated domain name, and sends the target stream pulling information to the user terminal 910. After the user terminal 910 receives the target stream pulling information sent by the media server 920, the user terminal 910 performs a domain name resolution on the target stream pulling information based on the preset domain name resolution method, obtains the IP address of the target intranet edge server, sends a target stream pulling request to the target intranet edge server 930 based on the IP address of the target intranet edge server, and obtains the target video stream returned by the target intranet edge server 930 based on the target stream pulling request.

For example, for the situation that the IP address of the target intranet edge server is indirectly obtained by utilizing an intranet management server, the video stream acquisition system may further include at least one intranet management server. An intranet management server may be deployed for each intranet, and based on the network topology structure of each intranet, at least one intranet edge server 930 corresponding to each intranet may be deployed. For example, an intranet edge server 930 may be deployed for each work area in the intranet. The implementation process of the video stream acquisition system may be as follows:

The user terminal 910 sends a stream pulling information acquisition request to the media server 920. The media server 920 determines the IP address of the target intranet management server based on the target exit IP address in the stream pulling information acquisition request, performs a domain name generation based on a preset domain name generation method and according to the IP address of the target intranet management server, determines the stream pulling management information according to the generated domain name, and sends the stream pulling management information to the user terminal 910. After the user terminal 910 receives the stream pulling management information sent by the media server 920, the user terminal 910 performs a domain name resolution on the stream pulling management information based on a preset domain name resolution method, obtains the IP address of the target intranet management server, and sends a stream pulling address acquisition request to the target intranet management server based on the IP address of the target intranet management server. The target intranet management server determines the IP address of the target intranet edge server based on the target intranet IP address in the stream pulling address acquisition request, performs the domain name generation based on the preset domain name generation method and according to the IP address of the target intranet edge server, determines the target stream pulling information based on the generated domain name, and sends the target stream pulling information to the user terminal 910. After the user terminal 910 receives the target stream pulling information sent by the target intranet management server, the user terminal 910 performs the domain name resolution on the target stream pulling information based on the preset domain name resolution method, obtains the IP address of the target intranet edge server, sends a target stream pulling request to the target intranet edge server 930 based on the IP address of the target intranet edge server, and obtains the target video stream returned by the target intranet edge server 930 based on the target stream pulling request.

For the video stutter prediction system in any embodiment of the present disclosure, by deploying the intranet edge server in the intranet, and by the way of the domain name resolution, the user terminal may directly pull a video stream from the specified target intranet edge server, and does not need to pull the video stream from the outer net, thereby greatly saving exit bandwidth and improving the efficiency of acquiring the video stream, and also ensuring the smoothness of video playback, and improving the user viewing experience.

Eighth Embodiment

Figure 10:
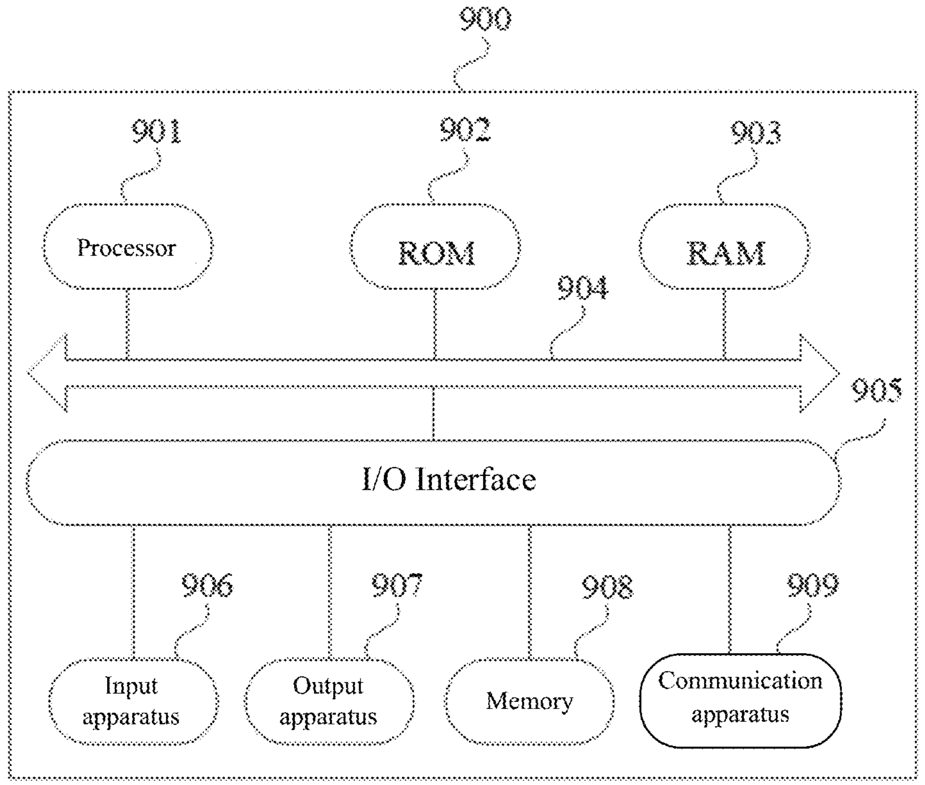
FIG. 10 is a structural schematic diagram of an electronic device provided in the eighth embodiment of the present disclosure.

The following refers to FIG. 10, and FIG. 10 illustrates a structural schematic diagram of the electronic device 900 that is suitable for implementing the embodiments of the present disclosure. The electronic device illustrated in FIG. 10 is only an example, and should not bring any limitation to the functions and using scop of the embodiments of the present disclosure.

As illustrated in FIG. 10, the electronic device 900 may include a processor 901 (e.g., a central processing unit, a graphics processing unit, etc.), which can perform various suitable actions and processing according to a program stored in a read-only memory (ROM) 902 or a program loaded from a memory 908 into a random-access memory (RAM) 903. The RAM 903 further stores various programs and data required for operations of the electronic device 900. The processor 901, the ROM 902, and the RAM 903 are interconnected by means of a bus 904. An input/output (I/O) interface 905 is also connected to the bus 904.

Usually, the following apparatus may be connected to the I/O interface 905: an input apparatus 906 including, for example, a touch screen, a touch pad, a keyboard, a mouse, a camera, a microphone, an accelerometer, a gyroscope, or the like; an output apparatus 907 including, for example, a liquid crystal display (LCD), a loudspeaker, a vibrator, or the like; a memory 908 including, for example, a magnetic tape, a hard disk, or the like; and a communication apparatus 909. The communication apparatus 909 may allow the electronic device 900 to be in wireless or wired communication with other devices to exchange data. While FIG. 10 illustrates the electronic device 900 having various apparatuses, it should be understood that not all of the illustrated apparatuses are necessarily implemented or included. More or fewer apparatuses may be implemented or included alternatively.

According to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 909 and installed, or may be installed from the memory 908, or may be installed from the ROM 902. When the computer program is executed by the processor 901, the above-mentioned functions defined in the methods of some embodiments of the present disclosure are performed.

The electronic device provided in the embodiments of the present disclosure and the video stream acquisition method provided in the above embodiments belong to the same concept. The technical details that are not described in the embodiments of the present disclosure may be referred to the above embodiments, and the embodiment of the present disclosure and the above embodiments have the same effect.

The embodiment of the present disclosure provides a computer storage medium. Computer programs are stored on the computer storage medium. When the computer programs are executed by a processor, the video stream acquisition method provided in the above embodiments is implemented.

Ninth Embodiment

The above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned user terminal, or may also exist alone without being assembled into the user terminal.

The above-mentioned computer-readable medium carries one or more programs, and when the one or more programs are executed by the electronic device, the user terminal is caused to:

send a stream pulling information acquisition request to a media server, to make the media server determine an IP address of a target intranet edge server based on a target exit IP address in the stream pulling information acquisition request, perform a domain name generation based on a preset domain name generation method and according to the IP address of the target intranet edge server, and determine target stream pulling information based on a generated domain name; acquire the target stream pulling information, perform a domain name resolution on the target stream pulling information based on a preset domain name resolution method, and obtain the IP address of the target intranet edge server; based on the IP address of the target intranet edge server, send a target stream pulling request to the target intranet edge server, and acquire a target video stream returned by the target intranet edge server based on the target stream pulling request.

The above-mentioned computer-readable medium may be included in the above-mentioned server, or may also exist alone without being assembled into the server.

The above-mentioned computer-readable medium carries one or more programs, and when the one or more programs are executed by the server, the server is caused to: receive a stream pulling information acquisition request sent by a user terminal; determine an IP address of a target intranet edge server based on a target exit IP address in the stream pulling information acquisition request; perform a domain name generation based on a preset domain name generation method and according to the IP address of the target intranet edge server, and determine target stream pulling information based on a generated domain name, to make the user terminal acquire the target stream pulling information, perform a domain name resolution on the target stream pulling information based on a preset domain name resolution method, obtain the IP address of the target intranet edge server, send a target stream pulling request to the target intranet edge server based on the IP address of the target intranet edge server, and acquire a target video stream returned by the target intranet edge server based on the target stream pulling request. Or, receive receiving a target stream pulling request sent by a user terminal based on an IP address of the intranet edge server, wherein the IP address of the intranet edge server is obtained by the user terminal, based on a preset domain name resolution method, performing a domain name resolution on target stream pulling information acquired by utilizing a media server; determine a target video stream corresponding to the target stream pulling request, and return the target video stream, to make the user terminal acquire the target video stream.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances, for example, the editable content displaying module may further be described as "editing unit".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments, [example 1] provides a video stream acquisition method, which is applied to a user terminal, and includes:

sending a stream pulling information acquisition request to a media server, to make the media server determine an IP address of a target intranet edge server based on a target exit IP address in the stream pulling information acquisition request, perform a domain name generation based on a preset domain name generation method and according to the IP address of the target intranet edge server, and determine target stream pulling information based on a generated domain name;

acquiring the target stream pulling information, performing a domain name resolution on the target stream pulling information based on a preset domain name resolution method, and obtaining the IP address of the target intranet edge server; and based on the IP address of the target intranet edge server, sending a target stream pulling request to the target intranet edge server, and acquiring a target video stream returned by the target intranet edge server based on the target stream pulling request.

According to one or more embodiments, [example 2] provides a video stream acquisition method, which is applied to a user terminal, and further includes:

the acquiring the target stream pulling information, including:

receiving the target stream pulling information sent by the media server.

According to one or more embodiments, [example 3] provides a video stream acquisition method, which is applied to a user terminal, and includes:

the acquiring the target stream pulling information, including:

receiving a stream pulling management information sent by the media server, wherein the stream pulling management information is determined by the media server determining an IP address of a target intranet management server based on the target exit IP address in the stream pulling information acquisition request, and performing the domain name generation based on the preset domain name generation method and according to the IP address of the target intranet management server;

based on the preset domain name resolution method, performing the domain name resolution on the stream pulling management information to obtain the IP address of the target intranet management server;

based on the IP address of the target intranet management server, sending a stream pulling address acquisition request to the target intranet management server, to make the target intranet management server determine the IP address of the target intranet edge server based on the target intranet IP address in the stream pulling address acquisition request, perform the domain name generation based on the preset domain name generation method and according to the IP address of the target intranet edge server, and determine the target stream pulling information based on the generated domain name; and receiving the target stream pulling information sent by the target intranet management server.

According to one or more embodiments, [example 4] provides a video stream acquisition method, which is applied to a user terminal, and further includes:

the performing a domain name resolution on the target stream pulling information based on a preset domain name resolution method, and obtaining the IP address of the target intranet edge server, including:

sending the target stream pulling information to a domain name resolution server, to make the domain name resolution server perform the domain name resolution on the target stream pulling information based on a preset domain name resolution method, and obtain the IP address of the target intranet edge server, wherein the domain name resolution server is a domain name resolution server in an intranet or a domain name resolution server in an outer net; and receiving the IP address of the target intranet edge server returned by the domain name resolution server.

According to one or more embodiments, [example 5] provides a video stream acquisition method, which is applied to a user terminal, and further includes:

the performing a domain name resolution on the target stream pulling information based on a preset domain name resolution, and obtaining the IP address of the target intranet edge server, including:

extracting target intranet edge server address information that has a preset domain name format from the target stream pulling information; and resolving the target intranet edge server address information into an IP address format, and obtaining the IP address of the target intranet edge server.

According to one or more embodiments, [example 6] provides a video stream acquisition method, which is applied to a media server, and includes:

receiving a stream pulling information acquisition request sent by a user terminal;

determining an IP address of a target intranet edge server based on a target exit IP address in the stream pulling information acquisition request; and performing a domain name generation based on a preset domain name generation method and according to the IP address of the target intranet edge server, and determining target stream pulling information based on a generated domain name, to make the user terminal acquire the target stream pulling information, perform a domain name resolution on the target stream pulling information based on a preset domain name resolution method, obtain the IP address of the target intranet edge server, send a target stream pulling request to the target intranet edge server based on the IP address of the target intranet edge server, and acquire a target video stream returned by the target intranet edge server based on the target stream pulling request.

According to one or more embodiments, [example 7] provides a video stream acquisition method, which is applied to a media server, and further includes:

the determining an IP address of a target intranet edge server based on a target exit IP address in the stream pulling information acquisition request, including:

based on a correspondence relationship between a preconfigured exit IP address and an IP address of an intranet edge server, and the target exit IP address in the stream pulling information acquisition request, determining the IP address of the target intranet edge server and the target exit IP address in the stream pulling information acquisition request; and after the performing a domain name generation based on a preset domain name generation method and according to the IP address of the target intranet edge server, and determining target stream pulling information based on a generated domain name, the method further including:

sending the target stream pulling information to the user terminal.

According to one or more embodiments, [example 8] provides a video stream acquisition method, which is applied to a media server, and further includes:

the determining an IP address of a target intranet edge server based on a target exit IP address in the stream pulling information acquisition request; performing a domain name generation based on a preset domain name generation method and according to the IP address of the target intranet edge server, and determining target stream pulling information based on a generated domain name, including:

determining an IP address of a target intranet management server based on the target exit IP address in the stream pulling information acquisition request, performing the domain name generation based on the preset domain name generation method and according to the IP address of the target intranet management server, and determining stream pulling management information based on the generated domain name; and sending the stream pulling management information to the user terminal, to make the user terminal perform the domain name resolution on the stream pulling management information based on the preset domain name resolution method, and obtain the IP address of the target intranet management server, and based on the IP address of the target intranet management server, sending a stream pulling address acquisition request to the target intranet management server, to make the target intranet management server determine the IP address of the target intranet edge server based on a target intranet IP address in the stream pulling address acquisition request, perform the domain name generation based on the preset domain name generation method and according to the IP address of the target intranet edge server, and determine the target stream pulling information based on the generated domain name.

According to one or more embodiments, [example 9] provides a video stream acquisition method, which is applied to a media server, and further includes:

the performing a domain name generation based on a preset domain name generation method and according to the IP address of the target intranet edge server, and determining target stream pulling information based on a generated domain name, including:

based on a preset domain name format, performing a format conversion on the IP address of the target intranet edge server, and adding a converted target intranet edge server address information into a stream pulling address, and determining the target stream pulling information.

According to one or more embodiments, [example 10] provides a video stream acquisition method, which is applied to a media server, and further includes:

the target intranet management server determines the IP address of the target intranet edge server based on a target intranet IP address in the stream pulling address acquisition request, including:

determining the IP address of the target intranet edge server by the target intranet management server based on a correspondence relationship between a preconfigured intranet IP address and an IP address of an intranet edge server and based on the target intranet IP address in the stream pulling address acquisition request.

According to one or more embodiments, [example 11] provides a video stream acquisition method, applied to an intranet edge server, and includes:

receiving a target stream pulling request sent by a user terminal based on an IP address of the intranet edge server, wherein the IP address of the intranet edge server is obtained by the user terminal, based on a preset domain name resolution method, performing a domain name resolution on target stream pulling information acquired by utilizing a media server; and determining a target video stream corresponding to the target stream pulling request, and returning the target video stream, to make the user terminal acquire the target video stream.

According to one or more embodiments, [example 12] provides a video stream acquisition method, which is applied to an intranet edge server, and further includes:

the determining a target video stream corresponding to the target stream pulling request, including:

based on the target video stream identification in the target stream pulling request, determining the target video stream from a cached video stream that is cached in advance.

According to one or more embodiments, [example 13] provides a video stream acquisition method, which is applied to an intranet edge server, and further includes:

the determining a target video stream corresponding to the target stream pulling request, including:

based on the target video stream identification in the target stream pulling request, detecting whether the target video stream exists in a cached video stream that has been cached currently;

in response to the target video stream existing in the cached video stream that has been cached currently, determining the cached video stream as the target video stream; and in response to the target video stream being absent from the cached video stream that has been cached currently, pulling the target video stream from an outer net edge server based on an outer net stream pulling address in the target stream pulling request, and caching the pulled target video stream.

According to one or more embodiments, [example 14] provides a video stream acquisition apparatus, which is integrated in a user terminal, and includes a stream pulling information acquisition request sending module, a domain name resolution module, and a target video stream acquisition module.

The stream pulling information acquisition request sending module is configured to send a stream pulling information acquisition request to a media server, to make the media server determine an IP address of a target intranet edge server based on a target exit IP address in the stream pulling information acquisition request, perform a domain name generation based on a preset domain name generation method and according to the IP address of the target intranet edge server, and determine target stream pulling information based on a generated domain name.

The domain name resolution module is configured to acquire the target stream pulling information, perform a domain name resolution on the target stream pulling information based on a preset domain name resolution method, and obtain the IP address of the target intranet edge server.

The target video stream acquisition module is configured to send a target stream pulling request to the target intranet edge server based on the IP address of the target intranet edge server, and acquire a target video stream returned by the target intranet edge server based on the target stream pulling request.

According to one or more embodiments, [example 15] provides a video stream acquisition apparatus, which is integrated in a media server, and includes a stream pulling information acquisition request receiving module, a target intranet edge server IP address determining module, and a target stream pulling information determining module.

The stream pulling information acquisition request receiving module is configured to receive a stream pulling information acquisition request sent by a user terminal.

The target intranet edge server IP address determining module is configured to determine an IP address of a target intranet edge server based on a target exit IP address in the stream pulling information acquisition request.

The target stream pulling information determining module is configured to perform a domain name generation based on a preset domain name generation method and according to the IP address of the target intranet edge server, and determine target stream pulling information based on a generated domain name, to make the user terminal acquire the target stream pulling information, perform a domain name resolution on the target stream pulling information based on a preset domain name resolution method, obtain the IP address of the target intranet edge server, and based on the IP address of the target intranet edge server, send a target stream pulling request to the target intranet edge server, and acquire a target video stream returned by the target intranet edge server based on the target stream pulling request.

According to one or more embodiments, [example 16] provides a video stream acquisition apparatus, which is integrated in a media server, and includes a target stream pulling request receiving module and a target video stream determining module.

The target stream pulling request receiving module is configured to receive a target stream pulling request sent by a user terminal based on an IP address of the intranet edge server, wherein the IP address of the intranet edge server is obtained by the user terminal based on a preset domain name resolution method, by performing a domain name resolution on target stream pulling information by using a media server to acquire.

The target video stream determining module is configured to determine a target video stream corresponding to the target stream pulling request, and return the target video stream to make the user terminal acquire the target video stream.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

The invention claimed is:

1. A video stream acquisition method, applied to a user terminal, comprising:

sending a stream pulling information acquisition request to a media server to cause the media server to: (i) determine an IP address of an intranet edge server based on an exit IP address in the stream pulling information acquisition request, (ii) generate a domain name based on a preset domain name generation method and according to the IP address of the intranet edge server, and (iii) determine stream pulling information based on the generated domain name;

acquiring the stream pulling information;

performing a domain name resolution on the stream pulling information based on a preset domain name resolution method, to obtain the IP address of the intranet edge server;

based on the IP address of the intranet edge server, sending a stream pulling request to the intranet edge server; and acquiring a video stream returned by the intranet edge server based on the stream pulling request.

2. The method according to claim 1, wherein the acquiring the stream pulling information, comprises: receiving the stream pulling information sent by the media server.

3. The method according to claim 1, wherein the acquiring the stream pulling information, comprises:

receiving a stream pulling management information sent by the media server, wherein the stream pulling management information is determined by the media server by determining an IP address of an intranet management server based on the exit IP address in the stream pulling information acquisition request, and generating the domain name based on the preset domain name generation method and according to the IP address of the intranet management server;

based on the preset domain name resolution method, performing the domain name resolution on the stream pulling management information to obtain the IP address of the intranet management server;

based on the IP address of the intranet management server, sending a stream pulling address acquisition request to the target intranet management server, to make the intranet management server determine the IP address of the target intranet edge server based on the intranet IP address in the stream pulling address acquisition request, generate the domain name based on the preset domain name generation method and according to the IP address of the intranet edge server, and determine the stream pulling information based on the generated domain name; and receiving the stream pulling information sent by the intranet management server.

4. The method according to claim 1, wherein the performing a domain name resolution on the stream pulling information based on a preset domain name resolution method, and obtaining the IP address of the intranet edge server, comprises:

sending the stream pulling information to a domain name resolution server, to make the domain name resolution server perform the domain name resolution on the stream pulling information based on the preset domain name resolution method, and obtain the IP address of the intranet edge server, wherein the domain name resolution server is a domain name resolution server in an intranet or a domain name resolution server in an outer net; and receiving the IP address of the intranet edge server returned by the domain name resolution server.

5. The method according to claim 1, wherein the performing a domain name resolution on the stream pulling information based on a preset domain name resolution, and obtaining the IP address of the intranet edge server, comprises:

extracting intranet edge server address information that has a preset domain name format from the stream pulling information; and resolving the intranet edge server address information into an IP address format, and obtaining the IP address of the intranet edge server.

6. A video stream acquisition method, applied to a media server, comprising:

receiving a stream pulling information acquisition request sent by a user terminal;

determining an IP address of a intranet edge server based on an target exit IP address in the stream pulling information acquisition request;

generating a domain name based on a preset domain name generation method and according to the IP address of the intranet edge server; and determining stream pulling information based on the generated domain name, to make the user terminal: (i) acquire the stream pulling information, (ii) perform a domain name resolution on the target stream pulling information based on a preset domain name resolution method to obtain the IP address of the intranet edge server, (iii) send a stream pulling request to the intranet edge server based on the IP address of the intranet edge server, and (iv) acquire a video stream returned by the intranet edge server based on the stream pulling request.

7. The method according to claim 6, wherein, the determining an IP address of a intranet edge server based on a exit IP address in the stream pulling information acquisition request, comprises:

based on a correspondence relationship between a preconfigured exit IP address and an IP address of an intranet edge server and based on the exit IP address in the stream pulling information acquisition request, determining the IP address of the intranet edge server, wherein after the generating the domain name based on the preset domain name generation method and according to the IP address of the intranet edge server, and determining stream pulling information based on the generated domain name, the method further comprises:

sending the stream pulling information to the user terminal.

8. The method according to claim 6, wherein the determining an IP address of a intranet edge server based on an exit IP address in the stream pulling information acquisition request, generating the domain name based on a preset domain name generation method and according to the IP address of the intranet edge server, and determining stream pulling information based on a generated domain name, comprises:

determining an IP address of a intranet management server based on the exit IP address in the stream pulling information acquisition request, generating the domain name based on the preset domain name generation method and according to the IP address of the intranet management server, and determining stream pulling management information based on the generated domain name; and sending the stream pulling management information to the user terminal, to make the user terminal perform the domain name resolution on the stream pulling management information based on the preset domain name resolution method, and obtain the IP address of the intranet management server, and based on the IP address of the intranet management server, sending a stream pulling address acquisition request to the intranet management server, to make the intranet management server determine the IP address of the target intranet edge server based on a intranet IP address in the stream pulling address acquisition request, generate the domain name based on the preset domain name generation method and according to the IP address of the intranet edge server, and determine and return the stream pulling information based on the generated domain name.

9. The method according to claim 6, wherein the generating the domain name based on a preset domain name generation method and according to the IP address of the intranet edge server, and determining stream pulling information based on a generated domain name, comprises:

based on a preset domain name format, performing a format conversion on the IP address of the intranet edge server, and adding a converted intranet edge server address information into a stream pulling address, and determining the stream pulling information.

10. The method according to claim 8, wherein the intranet management server determines the IP address of the intranet edge server based on an intranet IP address in the stream pulling address acquisition request, comprises:

determining the IP address of the intranet edge server by the intranet management server based on a correspondence relationship between a preconfigured intranet IP address and an IP address of an intranet edge server and based on the intranet IP address in the stream pulling address acquisition request.

11. A video stream acquisition method, applied to an intranet edge server, comprising:

receiving a stream pulling request sent by a user terminal based on an IP address of the intranet edge server, wherein the IP address of the intranet edge server is obtained by the user terminal performing a domain name resolution, using a preset domain name resolution method, on target stream pulling information acquired by the user terminal from a media server; and determining a video stream corresponding to the stream pulling request, and returning the video stream to cause the user terminal acquire the video stream.

12. The method according to claim 11, wherein the determining a video stream corresponding to the stream pulling request, comprises:

based on the video stream identification in the stream pulling request, determining the video stream from a cached video stream that is cached in advance.

13. The method according to claim 11, wherein the determining a video stream corresponding to the stream pulling request, comprises:

based on the video stream identification in the stream pulling request, detecting whether the video stream exists in a cached video stream that has been cached currently;

in response to the video stream existing in the cached video stream that has been cached currently, determining the cached video stream as the video stream; and in response to the video stream being absent from the cached video stream that has been cached currently, pulling the video stream from an extranet edge server based on an outer net stream pulling address in the stream pulling request, and caching the pulled video stream.

14. An electronic device, comprising:

at least one processor; and a memory, configured to store at least one program, wherein when the at least one program is executed by the at least one processor, the at least one processor implements the video stream acquisition method of claim 1.

15. A non-transitory computer-readable storage medium, storing computer programs, wherein when the computer programs are executed by a processor, the video stream acquisition method of claim 1 is implemented.

16. A computer program product, comprising a non-transitory computer-readable medium, storing a computer program, that, when executed by a processor, cause the video stream acquisition method of claim 1 to be performed.

17. The method according to claim 4, wherein the performing a domain name resolution on the stream pulling information based on a preset domain name resolution, and obtaining the IP address of the intranet edge server, comprises:

extracting intranet edge server address information that has a preset domain name format from the stream pulling information; and resolving the intranet edge server address information into an IP address format, and obtaining the IP address of the intranet edge server.

18. The method according to claim 8, wherein the generating the domain name based on a preset domain name generation method and according to the IP address of the intranet edge server, and determining stream pulling information based on a generated domain name, comprises:

based on a preset domain name format, performing a format conversion on the IP address of the intranet edge server, and adding a converted intranet edge server address information into a stream pulling address, and determining the stream pulling information.

* * * * *